US008775734B2

(12) United States Patent
Hamblin et al.

(10) Patent No.: US 8,775,734 B2
(45) Date of Patent: Jul. 8, 2014

(54) VIRTUAL DISKS CONSTRUCTED FROM UNUSED DISTRIBUTED STORAGE

(75) Inventors: Jeffrey B. Hamblin, Issaquah, WA (US); Saurabh Gupta, Bellevue, WA (US); Justin Neddo, Kenmore, WA (US); Joseph Sherman, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 311 days.

(21) Appl. No.: 13/297,245

(22) Filed: Nov. 15, 2011

(65) Prior Publication Data

US 2013/0124797 A1    May 16, 2013

(51) Int. Cl.
*G06F 12/00* (2006.01)
*G06F 3/06* (2006.01)

(52) U.S. Cl.
USPC ............... 711/114; 711/1; 711/154; 711/200; 711/E12.001; 718/100

(58) Field of Classification Search
None
See application file for complete search history.

(56) References Cited

U.S. PATENT DOCUMENTS

| 7,594,072 | B2 | 9/2009 | Osaki et al. | |
| 7,657,578 | B1 | 2/2010 | Karr et al. | |
| 8,060,883 | B1 * | 11/2011 | Rao et al. | 718/104 |
| 2002/0026558 | A1 * | 2/2002 | Reuter et al. | 711/114 |
| 2005/0010682 | A1 * | 1/2005 | Amir et al. | 709/238 |
| 2006/0218544 | A1 * | 9/2006 | Chakraborty et al. | 717/168 |
| 2008/0046485 | A1 | 2/2008 | De Spiegeleer | |
| 2008/0155223 | A1 | 6/2008 | Hiltgen et al. | |
| 2009/0300302 | A1 | 12/2009 | Vaghani | |
| 2009/0313363 | A1 | 12/2009 | Parsons et al. | |
| 2009/0319247 | A1 * | 12/2009 | Ratcliffe, III et al. | 434/350 |
| 2010/0161759 | A1 | 6/2010 | Brand | |
| 2011/0252270 | A1 * | 10/2011 | Abraham et al. | 714/4.1 |

OTHER PUBLICATIONS

Calzolari, et al., "High availability using virtualization", Retrieved at <<http://bibe.sns.it/~calzolari/publications/JPhysCS_HighAvailability.pdf>>, 17th International Conference on Computing in High Energy and Nuclear Physics, 2010, pp. 11.

* cited by examiner

*Primary Examiner* — Matthew Bradley
*Assistant Examiner* — Daniel Bernard
(74) *Attorney, Agent, or Firm* — Ben Tabor; Kate Drakos; Micky Minhas

(57) ABSTRACT

A virtual disk is comprised of segments of unused capacity of physical computer-readable storage media co-located with computing devices that are communicationally coupled to one another through network communications. The computing devices execute one or more of a client process, a storage process and a controller process. The controller processes manage the metadata of the virtual disk, including a virtual disk topology that defines the relationships between certain ones of the physical computer-readable storage media and a particular virtual disk. The client process provide data for storage to certain ones of the computing devices executing the storage processes, as defined by a virtual disk topology, and also read data from storage from those computing devices. The client process additionally expose the virtual disk in the same manner as any other computer-readable medium.

18 Claims, 9 Drawing Sheets

VIRTUAL DISKS CONSTRUCTED FROM UNUSED DISTRIBUTED STORAGE

BACKGROUND

Despite increasing network communication capabilities, including the ability to transmit large quantities of computer-readable data very quickly, the vast majority of computing devices are still equipped with computer-readable media that can store vast quantities of computer-readable data. For computing devices that share substantial amounts of information over network communications, such as server computing devices, a significant amount of the information utilized by such computing devices may, in fact, be stored on a computer-readable storage medium that is not co-located with, or installed in, that server computing device, but rather is, instead, co-located with another server computing device and is accessed via network communications. Consequently, in many instances, the computer-readable media that are co-located with any given server may be underutilized and have capacity that remains unutilized. The amount of unutilized computer-readable data storage capacity at any one server computing device, however, may not be sufficient, or can simply be too unsafe, to be utilizable for the sort of computer-readable data for which it would be desirable to use such storage.

SUMMARY

In one embodiment, storage capacity can be aggregated across multiple, individual computer-readable storage media that are co-located with multiple, individual computing devices that are communicationally coupled with one another. Such storage capacity can be aggregated into one or more "virtual disks" that can be utilized in a traditional manner. The storage capacity can be aggregated so that the virtual disks generated therefrom can exhibit both greater performance and greater reliability than any one or more individual computer-readable storage media from which such capacity is obtained.

In another embodiment, a set of communicationally coupled computing devices, at least some of which comprise co-located storage media having available capacity, can execute one or more of a client process, a storage process and a controller process for providing and utilizing virtual disks. Controller processes can host and manage the metadata of the virtual disks, including the topology of the disks. Storage processes can provide access to co-located storage media having available capacity, following the instructions provided to them by controller processes, and the requests provided to them by client processes. Client processes can present the virtual disks to the operating systems on their respective computing devices in the same manner as any other computer-readable storage device.

In a further embodiment, the controller processes can coordinate amongst themselves using a consensus algorithm or other distributed transaction system.

In a still further embodiment, the topology of the virtual disks can be based on multiple layers of abstraction and can take into account physical relationships between computing devices, such as sharing a common power source or a common physical location, to provide greater reliability by distributing data across such "failure domains".

In a yet further embodiment, the client processes can receive the topology of the virtual disks assigned to them from the controller processes and can direct the reads and writes of data, in the manner instructed by the virtual disk topology, to individual ones of the computing devices executing the storage processes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
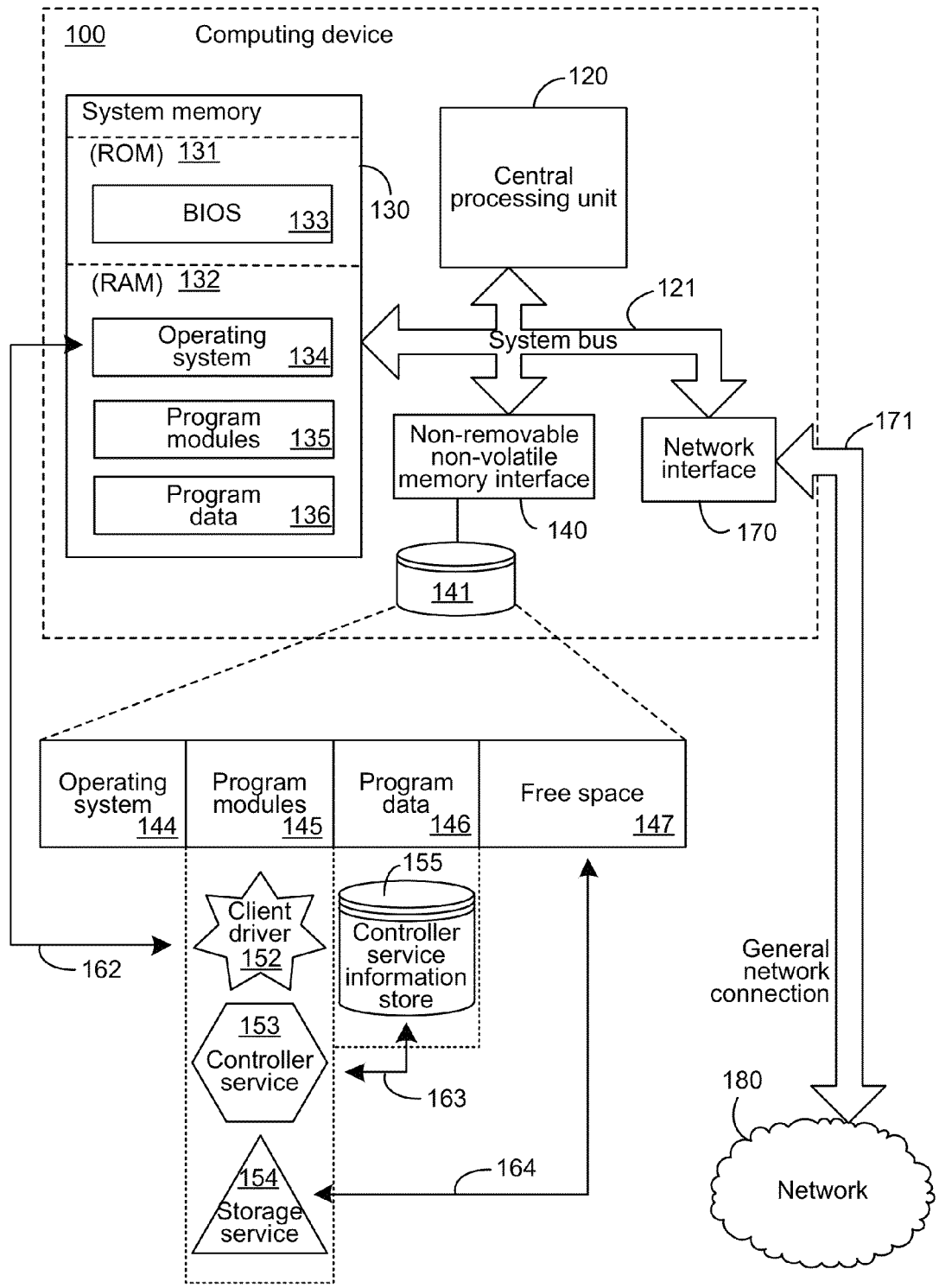
FIG. 1 is a block diagram illustrating an exemplary computing device.

The following description relates to a virtual disk that is comprised of segments of unused capacity of physical computer-readable storage media co-located with computing devices that are communicationally coupled to one another through network communications. The computing devices can execute one or more of a client process, a storage process and a controller process. The controller processes can manage the metadata of the virtual disk, including a virtual disk topology that can define the relationships between certain ones of the physical computer-readable storage media and a particular virtual disk. The virtual disk topology can be created and modified by the controller processes, and individual controller processes can coordinate using a distributed transaction system such that any change committed by a sufficient quantity, or percentage, of the controller processes to their individual libraries can be considered to be authoritative. The client processes can provide data for storage to certain ones of the computing devices executing the storage processes, as can be defined by a virtual disk topology, and can also read data from storage from those computing devices. The client processes can additionally expose the virtual disk, such as to the operating system executing on the computing device that is executing the client process, in the same manner as any other computer-readable medium.

The techniques described herein make reference to specific environments, such as networked collections of server computing devices. Such references, however, are strictly exemplary and are made for ease of description and presentation, and are not intended to limit the mechanisms described to the specific environments referenced. Instead, the mechanisms described herein are applicable to aggregate available capacity from computer-readable storage media that are communicationally coupled to distributed computing devices irrespective of the relationship of the individual computing devices to one another.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware and software elements that can be utilized in, and provide for, the mechanisms described below. The exemplary computing device 100 can include, but is not limited to, one or more central processing units (CPUs) 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the computing device 100 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The computing device 100 also typically includes computer-readable media, which can include any available media that can be accessed by computing device 100. By way of example, and not limitation, computer-readable media may comprise computer storage media and communication media. Computer storage media includes media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer-readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer-readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) such as the Internet, or other networks. The computing device 100 is connected to the general network connection 171 through a network interface or adapter 170 that is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The computing device 100 may include removable/non-removable, volatile/nonvolatile computer storage media. By way of example only, FIG. 1 illustrates a hard disk drive 141 that reads from or writes to non-removable, nonvolatile media, including magnetic media, solid-state media, and combinations thereof. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer-readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

For purposes of the descriptions below, the hard disk drive 141 is also illustrated as comprising free space 147 that represents storage capacity of the hard disk drive 141 that is not otherwise utilized by, for example, the operating system 144, the program modules 145 or the program data 146. In one embodiment, the program modules 145 can comprise at least one of a client driver 152, a controller service 153 and a storage service 154. The client driver 152, controller service 153 and storage service 154 are illustrated utilizing geometric shapes for purposes of differentiating among them in subsequent Figures. The storage service 154 can interface with the free space 147, as is shown by the relationship 164, to store data in the free space 147, or a portion thereof, thereby making the free space 147 usable as a storage medium to other computing devices, such as in the manner described in detail below. The controller service 153 can interface with a controller service information store 155, which, in one embodiment, can be part of the program data 146 that is stored on the hard disk drive 141. The controller service information store 155 can be a separately addressable collection of data, such as a information store, or it can be any other information store that can be either external to the controller service 153 itself, or internal to it, in the sense that it can be data utilized by the controller service 153, but not separately addressable and accessible by other processes. The interface between the controller service 153 and the controller service information store 155 is illustrated by the relationship 163. The client driver 152 can interface with the operating system, such as the executing operating system 134 in the system memory 130 of the computing device 100, to present a virtual disk that is comprised of aggregated portions of free space of the storage media of other computing devices that are remote from the computing device 100 and which are communicationally coupled to the computing device 100 via the above-described network interface 170, general network connection 171 and the network 180. In one embodiment, the client driver 152 can present, such as to the operating system 134, the virtual disk in the same manner as any other storage medium is presented, such as the hard disk drive 141, thereby enabling the operating system 134, as well as other program modules 135, to utilize such a virtual disk in the same manner as they would utilize any other storage medium including, for example, the hard disk drive 141. The interface between the client driver 152 and the operating system 134 is illustrated by the relationship 162.

Figure 2:
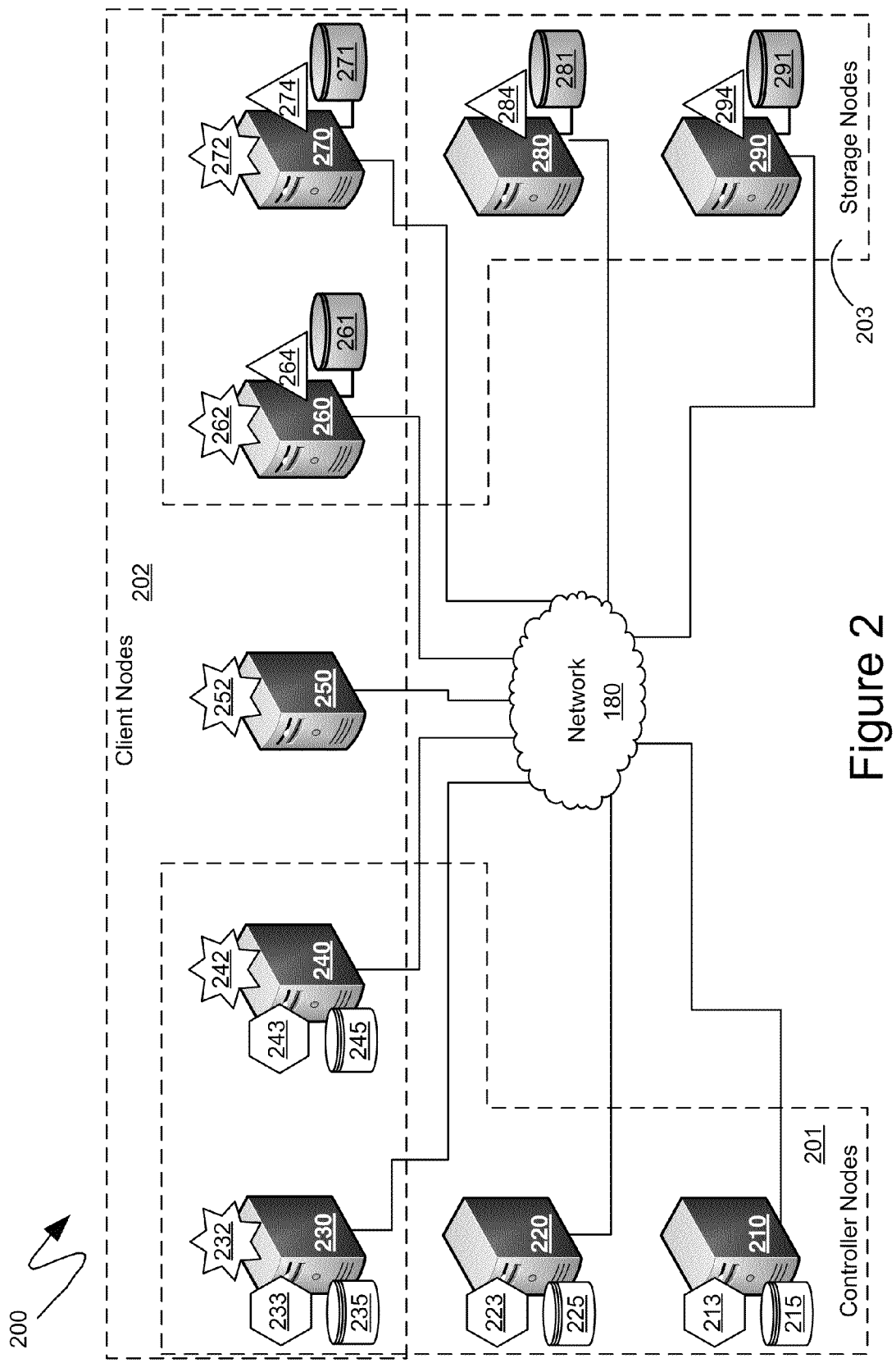
FIG. 2 is a block diagram illustrating an exemplary collection of computing devices supporting virtual disks.

Turning to FIG. 2, the system 200 shown therein illustrates an exemplary collection of computing devices, namely the computing devices 210, 220, 230, 240, 250, 260, 270, 280 and 290, that can all be communicationally coupled to one another, such as via the network 180. Each of the computing devices 210, 220, 230, 240, 250, 260, 270, 280 and 290 can comprise analogous aspects to those of the exemplary computing device 100 that was illustrated in FIG. 1 and described in detail above. At least some of the computing devices 210, 220, 230, 240, 250, 260, 270, 280 and 290 can execute a controller service, such as the controller service 153 that was illustrated in FIG. 1 and described above. For purposes of illustration, computing devices 210, 220, 230 and 240 are illustrated as executing controller services 213, 223, 233 and 243, respectively. As in FIG. 1, the controller services shown in FIG. 2 are illustrated in the form of a specific geographic shape, namely a hexagon, for ease of illustrative representation. Together with the controller services 213, 223, 233 and 243, the computing devices 210, 220, 230 and 240, respectively, can further comprise controller service information stores 215, 225, 235 and 245, respectively, that can be stored locally with those computing devices, and that can be utilized by the controller services 213, 223, 233 and 243, respectively. For purposes of illustration, the system 200 of FIG. 2 illustrates the computing devices 210, 220, 230 and 240 as comprising controller service information stores 215, 225, 235 and 245, respectively. The collection of computing devices executing such controller services, such as the computing devices 210, 220, 230 and 240, can comprise the controller nodes 201 as illustrated by the dashed lines of FIG. 2.

Similarly, at least some of the computing devices 210, 220, 230, 240, 250, 260, 270, 280 and 290 of the system 200 of FIG. 2 can execute a client driver, such as the client driver 152 that was illustrated in FIG. 1 and described above. For purposes of illustration, computing devices 230, 240, 250, 260 and 270 are illustrated as executing client drivers 232, 242, 252, 262 and 272, respectively. As in FIG. 1, the client drivers shown in FIG. 2 are illustrated in the form of a specific geographic shape, namely a star, for ease of illustrative representation. The collection of computing devices executing such client drivers, such as the computing devices 230, 240, 250, 260 and 270, can comprise the client nodes 202 as illustrated by the dashed lines of FIG. 2.

Lastly, for purposes of the present descriptions, at least some of the computing devices 210, 220, 230, 240, 250, 260, 270, 280 and 290 of the system 200 of FIG. 2 can execute a storage service, such as the storage service 154 that was illustrated in FIG. 1 and described above. For purposes of illustration, computing devices 260, 270, 280 and 290 are illustrated as executing storage services 264, 274, 284 and 294, respectively. As in FIG. 1, the storage services shown in FIG. 2 are illustrated in the form of a specific geographic shape, namely a triangle, for ease of illustrative representation. The computing devices 260, 270, 280 and 290, executing the storage services 264, 274, 284 and 294, respectively, can further comprise available storage capacity, such as in the form of free space, on computer-readable storage media that are communicationally coupled to those computing devices. For example, the computing devices 260, 270, 280 and 290 are shown in the system 200 of FIG. 2 as having computer-readable storage media 261, 271, 281 and 291 co-located with the computing devices 260, 270, 280 and 290, respectively, where each of the computer-readable storage media 261, 271, 281 and 291 can have available storage capacity that is not otherwise utilized by the computing devices 260, 270, 280 and 290, respectively. The collection of computing devices executing such storage devices, such as the computing devices 260, 270, 280 and 290, can comprise storage client nodes 203 as illustrated by the dashed lines of FIG. 2.

As can be seen from the system 200 of FIG. 2, a single computing device can be part of multiple groupings, such as of the controller nodes 201, the client nodes 202 and the storage nodes 203. For example, the computing devices 230 and 240 can be part of both the controller nodes 201 and the client nodes 202 since such computing devices can execute both the client drivers 232 and 242, respectively, and the controller services 233 and 243, respectively. Similarly, the computing devices 260 and 270 can be part of both the storage nodes 203 and the client nodes 202 since such computing devices can execute both the client drivers 262 and 272, respectively, and the storage services 264 and 274, respectively. For purposes of the descriptions below, a reference to a set of devices, such as the controller nodes 201, is meant to include all computing devices that are actively executing the relevant service or driver, such as the controller service, and performing the associated functionality. Similarly, computing devices can change which groupings they are a part of by commencing to execute a particular service or driver, or ceasing the execution of a particular service or driver. Thus, for purposes of the descriptions below, rather than referring to specific, individual computing devices, reference will more generally be made to groupings of computing devices, such as the above identified controller nodes 201, client nodes 202 and storage nodes 203.

Figure 3:
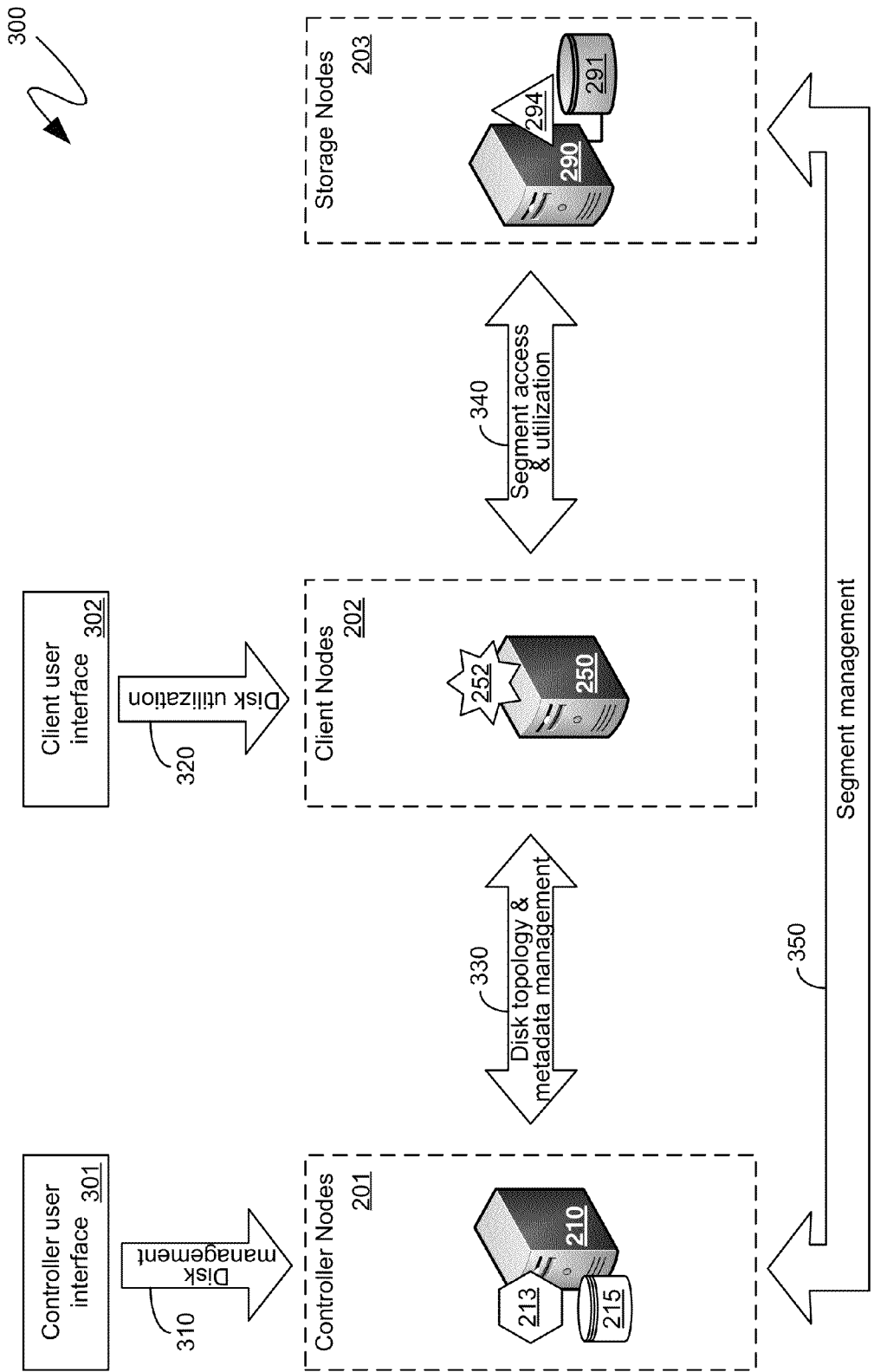
FIG. 3 is a block diagram illustrating an exemplary series of communications among different types of processes in implementing virtual disks.

Turning to FIG. 3, the system 300 shown therein illustrates an exemplary communicational arrangement between the different groupings or sets of computing devices that have been described above. In particular, as shown by the system 300 of FIG. 3, a controller user interface 301 can provide disk management instructions and communications to the controller nodes 201, such as the exemplary computing device 210 that is executing the controller service 213 and hosting the controller service information store 215. Similarly, as also shown by the system 300 of FIG. 3, a client user interface 302 can provide disk utilization instructions and communications to client nodes 202, such as the exemplary computing device 250 that is executing the client service 252. In one embodiment, the controller user interface 301 can be provided by the controller service itself, such as the controller service 213 executing on the computing device 210. In such an embodiment, a user of the computing device 210 can have access to the controller user interface 301 with which to provide disk management instructions 310 to the controller service 213 that is executing on that computing device. In another embodiment, however, the controller user interface 301 can be provided independently of the controller service itself, such as by being part of a different set of computer-executable instructions that can be executed independently of the controller service. In such another embodiment, the controller user interface 301 can be provided to the user by a computing device different and apart from any of the computing devices that are part of the controller nodes 201 such as, for example, an administrator computing device. The user of such an administrator computing device can then utilize the controller user interface 301 to provide disk management instructions 310 to any one or more of the controller nodes 201, such as the exemplary computing device 210. Similarly, in one embodiment, the client user interface 302 can be provided by the client driver itself, such as the client driver 252 executing on the computing device 250. In such an embodiment, a user of the computing device 250 can have access to the client user interface 302, which can provide disk utilization instructions 320 to the client driver 252 that is executing on the computing device 250. In another embodiment, however, the client user interface 302 can be provided independently of the client driver itself, thereby enabling an administrator to, for example, direct disk utilization instructions 320 to a series of computing devices executing client drivers, such as the computing devices that comprise the client nodes 202.

The controller nodes 201 can communicate with the client nodes 202 to share disk topology and metadata management communications 330. The disk topology and metadata management communications 330 can, as will be described in further detail below, include communications from the controller nodes 201, to the client nodes 202, informing the client nodes 202 of the topology of the one or more virtual disks that are being utilized by the client nodes 202. Additionally, the disk topology and metadata management communication 330 can also include communications from the client nodes 202, to the controller nodes 201, that can inform the controller nodes 201 of changes being requested by the client nodes 202, such as, for example, changes in the amount of storage capacity requested, or the creation, or deletion, of one or more virtual disks.

The controller nodes 201 can also communicate with the storage nodes 203 to share segment management communications 350. The segment management communications 350 can, as will be described in further detail below, include communications from the controller nodes 201, to the storage nodes 203, instructing the storage nodes 203 regarding individual storage segments that are supported by the available capacity of computer-readable storage devices that are communicationally coupled to the computing devices that comprise the storage nodes 203, such as the exemplary computer-readable storage media 291 that is communicationally coupled to the exemplary computing device 290. Additionally, the segment management communications 350 can comprise communications from the storage nodes 203, to the controller nodes 201, informing the controller nodes 201 as to the availability of storage capacity on computer-readable storage media that are communicationally coupled to the computing devices that comprise the storage nodes 203.

To utilize the virtual disks that are defined by the controller nodes 201, the client nodes 202 can communicate with the storage nodes 203 including segment access and utilization communications 340. The segment access and utilization communications 340 can include, as will be described in further detail below, the reads and writes of data, by the client nodes 202, to and from the computer-readable storage media that are communicationally coupled to the storage nodes 203, such as, for example, the exemplary computer-readable storage medium 291 that is communicationally coupled to the exemplary computing device 290.

Figure 4:
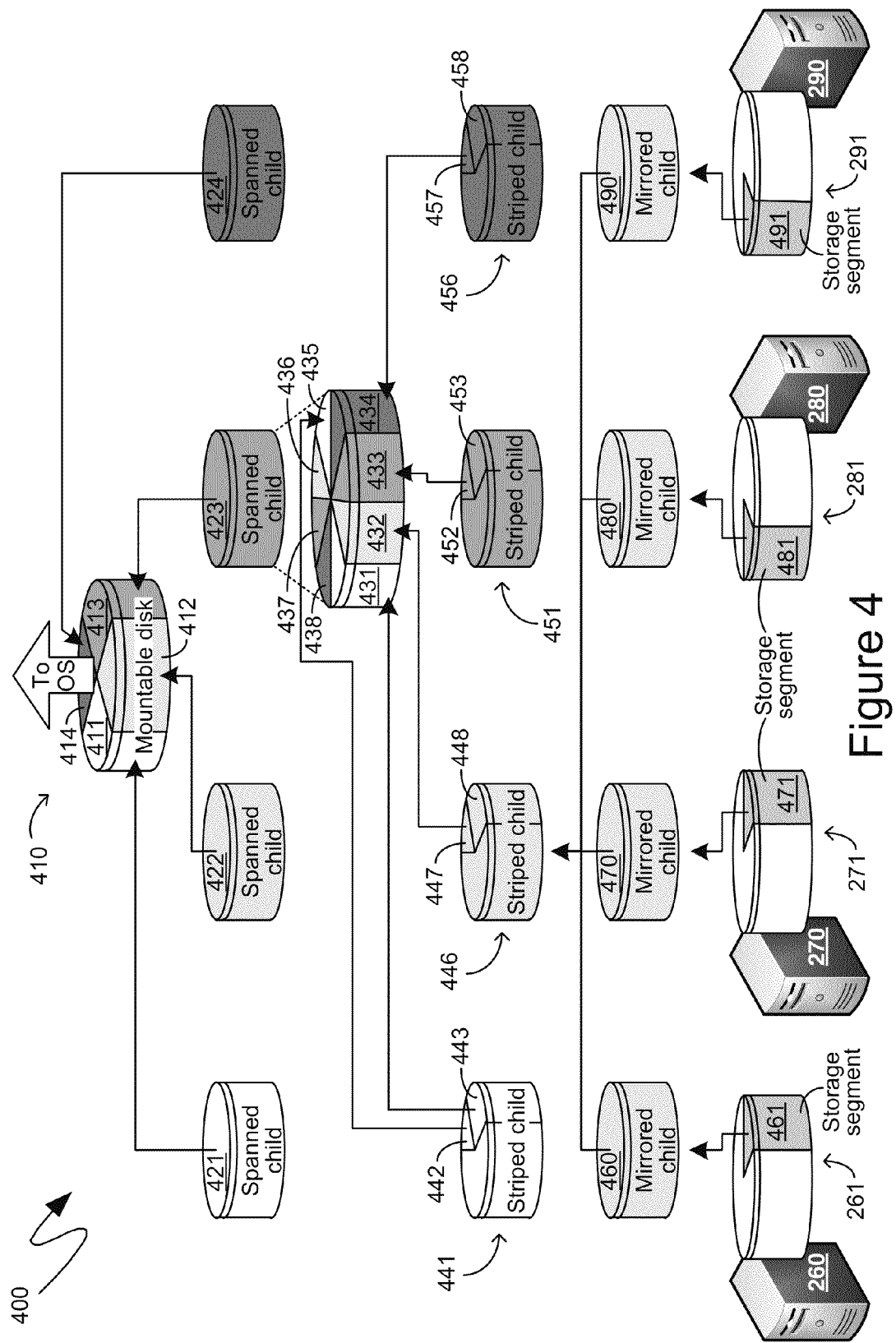
FIG. 4 is a block diagram illustrating an exemplary virtual disk topology.

Turning to FIG. 4, the system 400 shown therein illustrates an exemplary topology of a single virtual disk that can be generated by one or more of the controller nodes, subsequently communicated to one or more of the client nodes, and supported by one or more of the storage nodes. As indicated previously, virtual disks represent an aggregation of at least some of the available storage capacity of computer-readable storage media that are communicationally coupled to one or more computing devices which are, themselves, communicationally coupled, such as through a network of such computing devices. Consequently, as utilized herein, the term "virtual disk" means the data storage capability that is presented as a single storage medium but that is supported by multiple, independent computer-readable storage media that are physically distinct and separate from one another and are not co-located. In one embodiment, a virtual disk is supported by multiple, independent computer-readable storage media in such a manner as to provide both greater reliability and greater efficiency than could be provided by any one of the computer-readable storage media by itself. To achieve such greater reliability and greater efficiency, the individual, physical computer-readable storage media are grouped into multiple layers of abstraction, such as will be described in greater detail with reference to the topology illustrated by the system 400 of FIG. 4. Thus, as utilized herein, the term "topology" means the structural definition of how individual, physical computer-readable storage media support a single virtual disk.

The system 400 of FIG. 4, illustrates an exemplary topology of a single virtual disk, namely the virtual disk 410, which, as illustrated, is a "mountable" disk that can be presented to an operating system and can be mounted by the operating system for utilization by that operating system and other application programs and processes supported by that operating system. For purposes of illustration, the virtual disk 410 can be supported by four physical computer-readable storage media, namely the physical computer-readable storage medium 261 that is communicationally coupled to the computing device 260, the physical computer-readable storage medium 271 that is communicationally coupled to the computing device 270, the physical computer-readable storage medium 281 that is communicationally coupled to the computing device 280, and the physical computer-readable storage medium 291 that is communicationally coupled to the computing device 290. As will be recognized from FIG. 2, the computing devices 260, 270, 280 and 290, to which the computer-readable storage media 261, 271, 281 and 291, respectively, are communicationally coupled, are the computing devices that comprise the storage nodes 203. Each of the computer-readable storage media 261, 271, 281 and 291 can comprise a certain amount of capacity that remains unutilized and not otherwise reserved and, thus, is available to be shared with other computing devices, such as in the manner described herein to support a "virtual disk".

Within that unutilized capacity, a storage segment can be created that can comprise computer-readable data associated with a single virtual disk that is stored on that particular computer-readable medium. For example, the computing device 260 can have, communicationally coupled to it, the computer-readable storage medium 261. Within the available storage capacity of the computer-readable storage medium 261, a storage segment 461 can be created. As is illustrated by the system 400 of FIG. 4, the storage segment 461 can provide for the storage of computer-readable data that was stored on the virtual disk 410, thereby supporting the virtual disk 410. A different virtual disk can be supported by another, different storage segment on the same computer-readable storage medium 261, thus enabling a single computer-readable storage medium to support multiple virtual disks that are being utilized by multiple ones of the client nodes. For simplicity, however, the system 400 of FIG. 4 illustrates only a single storage segment on each of the computer-readable storage media shown therein. Thus, the computer-readable storage medium 271, which is communicationally coupled to the computing device 270 can, likewise, comprise a storage segment 471, while the computer-readable storage medium 281, which is communicationally coupled to the computing device 280, can comprise a storage segment 481, and the computer-readable storage medium 291, which is communicationally coupled to the computing device 290, can comprise a storage segment 491.

The utilization of the storage segments 461, 471, 481 and 491, in supporting the virtual disk 410, can best be described utilizing a "top-down" description commencing with the virtual disk 410. In particular, as indicated previously, the virtual disk 410 can be presented to an operating system, such as an operating system of a computing device executing a client driver. As presented by such a client driver, the virtual disk 410 can appear, such as to the operating system and other applications and processes supported thereby, as a single computer-readable storage medium that is communicationally coupled to the computing device on which such a client driver is executing. The operating system and other applications and processes can, thereby, store data on the virtual disk 410, and read data from the virtual disk 410, in much the same manner as they would store and retrieve such data to and from other computer-readable storage media that would be communicationally coupled to that computing device.

In one embodiment, the data that is stored on the virtual disk 410 can be spanned across multiple "child" disks, such as the spanned child disks 421, 422, 423 and 424. As will be recognized by those skilled in the art, disk spanning involves the aggregation of storage capacities of multiple, independent disks into a single disk having a capacity approximately equivalent to the sum of the capacities of the multiple, independent disks supporting the spanning. Thus, in the embodiment illustrated by the system 400 FIG. 4, the data storage capacity of the virtual disk 410 can be supported by spanning the spanned child disks 421, 422, 423 and 424 together. Graphically, such spanning is illustrated by the arrows connecting the individual spanned child disks 421, 422, 423 and 424 to various portions of the virtual disk 410 that are meant to represent fractions of the storage capacity of the virtual disk 410. For example, the spanned child 421 can support the storage capacity of the segment 411 of the virtual disk 410. Similarly, the spanned child 422 can support the storage capacity of the segment 412 of the virtual disk 410, and likewise the spanned child of 423 can support the storage capacity of the segment 413 of the virtual disk 410, and the spanned child 424 can support the storage capacity of the segment 414 of the virtual disk 410. To illustrate via a specific example, if the virtual disk 410 represented 400 gigabytes of available storage capacity, each of the spanned child disks 421, 422, 423 and 424 can represent 100 gigabytes of that available storage capacity such that spanning those four child disks together provides for the 400 gigabytes of available storage capacity that is being presented by the virtual disk 410. Thus, in such a specific example, the segments 411, 412, 413 and 414 of the virtual disk 410 can each represent a 100 gigabyte segment of the 400 gigabyte virtual disk 410, and each of those segments can be supported by the spanned child disks 421, 422, 423 and 424, respectively, which can, themselves, each be at least 100 gigabytes in size.

As will be recognized by those skilled in the art, spanning enables the creation of a single, larger data storage capacity disk from multiple, smaller data storage capacity disks. In one embodiment, in addition to utilizing spanning techniques to increase storage capacity, striping techniques can be utilized to increase performance. In particular, each of the spanned child disks 421, 422, 423 and 424 can, individually, be striped across multiple striped child disks. For example, the spanned child disk 423 can be striped across the striped child disks 441, 446, 451 and 456, such as in the manner illustrated by the system 400 FIG. 4. Although not explicitly illustrated in FIG. 4 to maintain graphical simplicity, each of the other spanned child disks, namely the spanned child disks 421, 422 and 424 can, likewise, be striped across multiple striped child disks that, in one embodiment, are different from the striped child disks 441, 446, 451 and 456.

As will be recognized by those skilled in the art, disk striping comprises spreading data across multiple disks in an interleaved fashion. Thus, for example, the spanned child 423 can be conceptualized as having a series of contiguous blocks of storage capacity 431, 432, 433, 434, 435, 436, 437 and 438. While the blocks of storage capacity 431, 432, 433, 434, 435, 436, 437 and 438 are illustrated as comprising all of the spanned child disk 423, such an illustration is merely for visual simplicity and is not intended to indicate that the spanned child disk 423 is composed entirely of only those blocks. Instead, the blocks 431, 432, 433, 434, 435, 436, 437 and 438 are merely meant to represent a portion of the storage capacity of the spanned child 423 to illustrate how such a portion is striped across the striped child disks 441, 446, 451 and 456. In particular, as illustrated by the arrows from the striped child disks 441, 446, 451 and 456, one block of the spanned child 423, such as the block 431, can be supported by a portion 442 of the storage capacity of the striped child 441, while another block of the spanned child 423, such as the block 432, that is contiguous with the block 431 can be supported by a portion 447 of the storage capacity of the striped child 446 that is different from the striped child 441. Similarly, a block 433, of the spanned child 423, that is contiguous with the block 432 can be supported by a portion 452 of the storage capacity of the striped child 451 that can be different from the previously referenced striped child disks 441 and 446, and a block 434 of the spanned child 423, that is contiguous with the block 433, can be supported by a portion 457 of the storage capacity of the striped child 456 that can be different from the previously referenced striped child disks 441, 446 and 451. Although not specifically illustrated, another four contiguous blocks of the spanned child 423, namely the blocks 435, 436, 437 and 438, can be supported by the portions 443, 448, 453 and 458, respectively, of the striped child disks 441, 446, 451 and 456, respectively. The shading of the individual blocks 431, 432, 433, 434, 435, 436, 437 and 438 is meant to illustrate the relationship between those individual blocks and the striped child disks 441, 446, 451 and 456 on which the data from those individual blocks is stored.

As will be recognized by those skilled in the art, disk striping can provide for increased performance since multiple segments of data can be read or written simultaneously. For example, to read the data stored on the blocks 431, 432, 433 and 434 of the spanned child disk 423, a conventional disk would sequentially read first the data from the block 431, followed by the data from the block 432, followed by the data from the block 433, and lastly followed by the data from the block 434. Conversely, because the spanned child 423 can be striped across multiple striped child disks the data stored on the block 431 can be read from the block 442 of the striped child 441 at the same time as the data that is stored on the block 432 is read from the block 447 that is stored on the striped child 446, and at the same time as the data that is stored on the block 433 is read from the block 452 that is stored on striped child 451, and at the same time as the data that is stored on the block 434 is read from the block 457 that is stored on striped child 456, thereby enabling the reading of the data that is stored on the blocks 431, 432, 433 and 434 simultaneously and in parallel, as opposed to sequentially, thereby improving performance. While the above example was provided within the context of the reading of data, the writing of data can occur in an analogously parallel manner, thereby providing increased performance while storing data, as well as reading data previously stored. Again, although not specifically illustrated, each of the spanned child disks 421, 422 and 424 can be similarly striped across multiple striped child disks that, in one embodiment, are different from the striped child disks 441, 446, 451 and 456 supporting the spanned child disk 423.

In one embodiment, each of the striped child disks that support the spanned child disks that support the virtual disk 410 can, themselves, be mirrored across multiple mirrored child disks. For example, the striped child disk 446 can be mirrored across the mirrored child disks 460, 470, 480 and 490. As will be recognized by those skilled in the art, mirroring comprises maintaining a complete and accurate copy of all of the data of one disk on at least one other disk such that if one disk fails, no data is lost and all of the data remains accessible. Consequently, the mirroring of the striped child disk 446 across the mirrored child disks 460, 470, 480 and 490 can comprise the maintenance of a complete copy of the data that is stored on the striped child disk 446 on each of the mirrored child disks 460, 470, 480 and 490, thereby improving the reliability and availability of the data of the striped child disk 446.

Each of the mirrored child disks 460, 470, 480 and 490 can be supported by a storage segment on a physical computer-readable storage medium communicationally coupled to a computing device that is part of the storage nodes described above. For example, the mirrored child disk 460 can comprise all of the data of the striped child disk 446 and all of the data of that mirrored child disk 460 can be stored on the physical computer-readable storage medium 261, namely in the storage segment 461. Similarly, the data of the mirrored child disk 470 can be stored in the storage segment 471 on the physical computer-readable storage medium 271, the data of the mirrored child disk 480 can be stored in the storage segment 481 on the physical computer-readable storage medium 281, and the data of the mirrored child disk 490 can be stored in the storage segment 491 on the physical computer-readable storage medium 291. The other striped child disks, such as the striped child disks 441, 451 and 456 can, likewise, be mirrored across multiple mirrored child disks, that can, in one embodiment, be different from the mirrored child disks 460, 470, 480 and 490 that comprise mirrored copies of the data of the striped child disk 446. Each of those other mirrored child disks can, themselves, be supported by a storage segment on a physical computer-readable storage medium. For graphical simplicity, the mirroring of the striped child disks 441, 451 and 456 is not shown in FIG. 4.

A topology of a virtual disk, such as the topology illustrated by the system 400 of FIG. 4, can be provided to a client driver by one or more of the controller nodes, such as in the manner described in detail below. Utilizing such a topology, the client driver can determine where to direct the reading and writing of specific data in order to implement the virtual disk 410. For example, the client driver can receive data from the operating system, to which the client driver has presented the virtual disk 410, which the operating system desires to store on that virtual disk. The client driver can then direct that data to the appropriate ones of the computing devices that have communicationally coupled to them the computer-readable storage media upon which data directed to be stored on the virtual disk 410 is actually stored. Four such computing devices, and four such associated computer-readable storage media, namely the computing devices 260, 270, 280 and 290 and the computer-readable storage media 261, 271, 281 and 291, respectively, are shown in the system 400 of FIG. 4 although, as explained previously, such computing devices and associated computer-readable storage media are only a portion of the total number of computing devices and associated computer-readable storage media that could be utilized to implement the virtual disk 410 in accordance with the topology illustrated by the system 400 of FIG. 4.

Returning to the above example of the client driver receiving data that is to be stored on the virtual disk 410, the data received by the client driver can be stored in any one or more of the portions 411, 412, 413 and 414 of the virtual disk 410. For example, if the data being stored is part of a large database, then, due to its size, such data could extend across multiple ones of the portions 411, 412, 413 and 414 of the virtual disk 410. Alternatively, as another example, if the virtual disk 410 has been utilized for an extended period of time, the fragmentation of available storage capacity can cause some data to be stored in one portion, such as the portion 411, and the remaining data to be stored in another portion, such as the portion 412. The client driver receiving the data that is to be stored on the virtual disk 410 can determine within which of the portions 411, 412, 413 and 414 of the virtual disk 410 such data is to be stored and can then direct such data to appropriate ones of the spanned child disks 421, 422, 423 and 424.

For purposes of continuing the above example, the data received by the client driver for storage on the virtual disk 410 can be determined to be stored in the portion 413, which is supported by the spanned child disk 423. Thus, the data received by the client driver can be directed to the spanned child disk 423 where, as indicated previously, it can be striped across the striped child disks 441, 446, 451 and 456 in an interleaved manner. Such a striping can be performed by the client driver in accordance with the topology of the virtual disk 410. As will be recognized by those skilled in the art, each of the striped child disks 441, 446, 451 and 456 that support the spanned child disk 423 can end up with specific, interleaved, portions of the data that was directed to the spanned child disk 423.

Those specific, interleaved portions of the data that are stored on any one specific striped child disk can then be mirrored by multiple mirrored child disks that support that striped child disk. For example, the client driver can have directed, to the striped child disk 446, a specific, interleaved set of data. That set of data can, as part of the client's "storing" of it on the striped child disk 446, be mirrored among the mirrored child disks 460, 470, 480 and 490 that support that striped child disk 446. As indicated previously, the mirrored child disks 460, 470, 480 and 490 are supported by the storage segments 461, 471, 481 and 491, respectively, that are stored on the computer-readable storage media 261, 271, 281 and 291, respectively, that are communicationally coupled to be computing devices 260, 270, 280 and 290, respectively. Thus, in the particular exemplary topology illustrated by the system 400 of FIG. 4, the storage of data, by the client driver, on the striped child disk 446, such as in the interleaved manner described above, can, in actuality, entail the storage of that data on the computer-readable storage media 261, 271, 281 and 291 in the storage segments 461, 471, 481 and 491, respectively, that support the mirrored child disks 460, 470, 480 and 490, respectively, among which the striped child disk 446 is mirrored. In such a manner, the client driver can determine which portions of the data that was provided to it, such as by the operating system, for storage on the virtual disk 410 are to be directed to specific ones of the storage nodes, to be stored on the computer-readable storage media that is communicationally coupled with the computing devices that comprise those storage nodes. Similarly, the client driver can determine from which ones of the storage nodes data is to be read when the client driver is requested to retrieve data from the virtual disk 410.

As indicated previously, each of the mirrored child disks 460, 470, 480 and 490 can comprise all of the data stored on the striped child disk 446. Since the mirrored child disks 460, 470, 480 and 490 are supported by the storage segments 461, 471, 481 and 491 on the physical computer-readable storage media 261, 271, 281 and 291, should one of those physical computer-readable storage media become unavailable, such as if the physical computer-readable storage medium were to experience a hardware failure, or if the computing device to which such a computer-readable storage medium was communicationally coupled were to experience a network communication failure, then the mirrored child disk that was supported by the storage segment stored on that computer-readable storage medium would no longer be available. Since each of the mirrored child disks comprises the same data, so long as at least one of those mirrored child disks remains operational, or, more specifically, so long as at least one of the computer-readable storage media comprising the storage segment that supports that mirrored child disk remains operational, then the data that is stored on the striped child disk, which is duplicated at each of the mirrored child disks, remains accessible and the virtual disk 410 can operate properly.

In one embodiment, a mirrored child disk, such as the mirrored child disks 460, 470, 480 and 490 shown in the system 400 of FIG. 4, can be in one of three states of operation. One such operational state can be the active state in which the mirrored child disk, or, again, more specifically, the computer-readable storage medium on which is stored a storage segment supporting that mirrored child disk, is active and has the latest version of the data. In such an active state, the mirrored child disk can process both requests to read data from the mirrored child disk and requests to write data to the mirrored child disk. Another such operational state can be the offline state in which the mirrored child disk is unavailable. As indicated previously such an operational state can be a result of a hardware failure of the computer-readable storage medium on which the storage segments supporting the mirrored child disk is stored, or it could be the result of a communicational failure with the computing device to which such a computer-readable storage medium is communicationally coupled.

The third operational state of a mirrored child disk can be the syncing operational state which the mirrored child disk can enter after it has been in an offline state. For example, if a power outage had affected the computing device that is communicationally coupled to the computer-readable storage medium on which a storage segment was stored that supported the mirrored child disk, the mirrored child disk supported by such a storage segment could enter the syncing state, after power was restored, in order to determine what changes have occurred while that mirrored child disk was offline. In the syncing state, the mirrored child disk can be available but it may not have the latest version of all the data and can, consequently, be in the process of syncing, from other mirrored child disks, those regions, or that data, that is out of date. While in the syncing state, the mirrored child disk may not be able to process requests for data from data regions or ranges that have not yet been updated. However, the mirrored child disk in the syncing state can still receive and perform requests to write or store data.

In one embodiment, a mirrored child disk can have associated with it an indicator that can identify whether the data on that mirrored child disk needs to be synchronized with other active mirrored child disks. For example, there may exist two cases where mirrored child disks can disagree on data: a first use of a mirrored child disk by subsequent use of a mirrored child desk after an improper shutdown, such as due to a power loss. To address such cases, the above-referenced indicator can be utilized and, in particular, can be initialized to one value when a mirrored child disk is first mounted. That indicator can then remain unchanged until the mirrored child disk has been synchronized and maintains an equivalent copy of the data as other active mirrored child disks, at which point the indicator can be changed.

In one embodiment, the client driver can maintain the mirrored child disk states, such that it is aware of the mirrored child disk states at any time, and the client driver can utilize the controller nodes, such as in the manner described in detail below, to store and retain such virtual disk metadata. In one embodiment if a mirrored child disk is the last active mirrored child disk in a set of the mirrored child disks that, for example, support a single striped child disk, then that last remaining active mirrored child disk can receive special treatment in the sense that it can be prevented from going offline, to the extent possible. If the last remaining active mirrored child disk does become temporarily unavailable, then any attempts to read data from or write data to that mirrored child disk may timeout and fail. However, there should not be any loss of data unless that last active mirrored child disk becomes permanently unavailable before another mirrored child disk had become active. Consequently, the client driver can recognize the existence of a single active remaining mirrored child disk and can attempt to create another mirrored child disk to reintroduce a level of fault tolerance to the virtual disk, including causing another mirrored child disk that is in the syncing state to sync as quickly as possible, or requesting, from the controller nodes, a wholly new mirrored child disk, such as from a different storage segment on a different computer-readable storage medium that is communicationally coupled to another of the storage nodes. In one embodiment, the level of fault tolerance, such a minimum or maximum number of mirrored child disks, can be an adjustable setting, such as through the client user interface 302 that was shown in FIG. 3.

The system 400 of FIG. 4, described in detail above, provides one illustrative example of a topology of a virtual disk. As indicated, the spanning, striping and mirroring illustrated by the system 400 of FIG. 4 can provide the virtual disk 410 with specific advantages, such as, for example, performance advantages, reliability advantages, and storage capacity advantages. Nevertheless, the mechanisms described herein can equally support other topologies, including both simpler topologies, and more complex topologies having either fewer, or greater, levels of abstraction.

Figure 5:
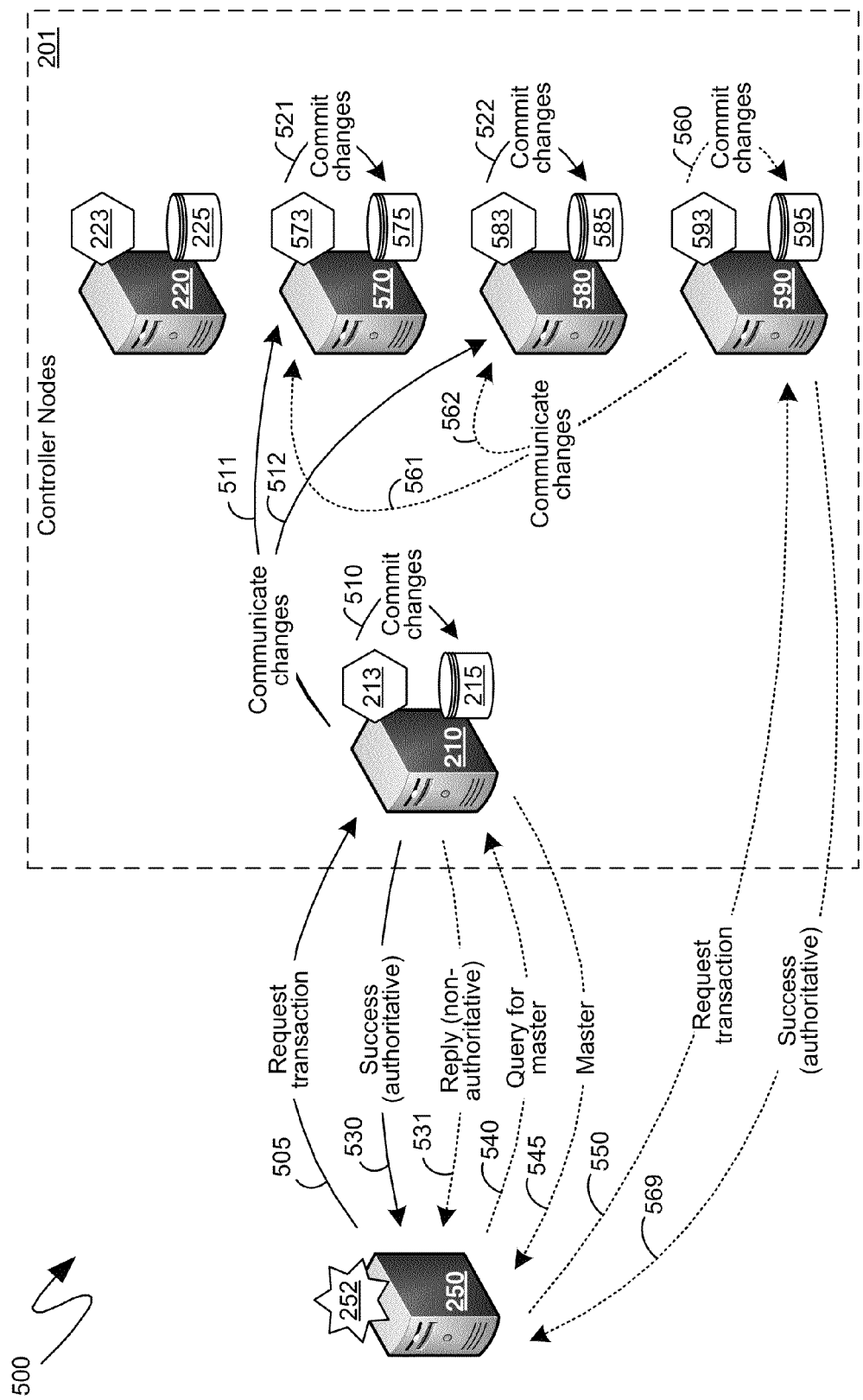
FIG. 5 is a block diagram illustrating an exemplary series of communications between a client and controller nodes in implementing virtual disks.

In one embodiment, a topology of a virtual disk, as well as other virtual disk metadata can be communicated between computing devices executing controller services and a computing device executing a client driver, which, as indicated previously, can present the virtual disk to the operating system and other applications executing on that computing device, thereby enabling them to utilize the presented virtual disk for the storage of computer-readable data. Turning to FIG. 5, the system 500 shown therein illustrates an exemplary set of communications between a computing device 250 executing a client driver 252 and the controller nodes 201 that can be comprised of computing devices executing controller services, such as the computing devices 210, 220, 570, 580 and 590 executing the controller services 213, 223, 573, 583 and 593 respectively. In one embodiment, the controller nodes can coordinate with one another using a consensus algorithm or other distributed transaction system such that, so long as at least a threshold number, or percentage, of the controller nodes are in agreement as to a current state, that state is deemed to be correct. As will be recognized by those skilled in the art, by implementing a distributed transaction system, the controller nodes 201 can survive a failure of up to a defined number, or percentage, of the controller nodes 201 and still maintain proper operation. The system 500 of FIG. 5 illustrates one exemplary operation of the controller nodes 201 implementing such a distributed transaction system.

For example, initially, the client driver 252, executing on the computing device 250, can request a transaction from a controller service, such as the controller service 213, that is executing on the computing device 210. The request can be communicated from the computing device 250 to the computing device 210 via the communication 505 that is shown in the system 500 of FIG. 5. The transaction requested by the communication 505 can include the creation or deletion of a virtual disk, the mounting or dismounting of a virtual disk, or changes to the topology or other metadata of the virtual disk, including those described in detail above. If the computing device 210, to which the communication 505 is directed, is currently acting as the master of the controller nodes 201, then the controller service 213 executing on the computing device 210 can make the relevant changes to its controller service information store 215, as illustrated by the communication 510 and can also communicate the relevant changes to other ones of the client nodes 201 such as, for example, the computing devices 570 and 580, as illustrated by the communications 511 and 512. Upon receiving the communications 511 and 512, the controller services 573 and 583 executing on the computing devices 570 and 580, respectively, can make the relevant changes to their controller service information stores 575 and 585, respectively, as illustrated by the communications 521 and 522, respectively. Once such changes have been made to more than a defined number, or a defined percentage, of the controller service information stores that are locally maintained by the computing devices that comprise the controller nodes 201, such as, for example, the controller service information stores 215, 575 and 585, the computing device 210 can return a success message to the client driver 252, that is executing on the computing device 250. In one embodiment, the success message returned by the computing device 210 to the client driver 252, such as the communication 530 shown in FIG. 5, can be sent with an authoritative indicator set, thereby indicating that a sufficient number, or percentage, of the controller nodes 201 have committed the relevant change to their respective controller service information stores and, therefore, the success is authoritative as among the distributed transaction system that is being maintained by the controller nodes 201.

In some distributed transaction systems, only specific ones of the computing devices in such distributed transaction systems are allowed to propose, or otherwise initiate, changes that are to be committed by the distributed transaction system. For example, in some distributed transaction systems, computing devices that have only recently joined, or recently rejoined, the distributed transaction system, and may not have, in their local stores, an up-to-date copy of the data being maintained by the distributed transaction system, may not be allowed to propose new changes until their local copies are brought up to date. Similarly, as another example, in some distributed transaction systems, a specific, single computing device is elected to serve as a single initiating point for all changes that are to be committed by the distributed transaction system, and such a computing device serves that role until it fails, at which point in time a new computing device can be elected to serve such a role. For purposes of the descriptions below, a computing device, in a distributed transaction system, that is allowed to initiate changes in that distributed transaction system will be referred to as a "master" and, depending on the type of distributed transaction system implemented, there may be only a single master or multiple simultaneous masters. In other distributed transaction systems, however, there may not be any limitations as to which computing devices are allowed to propose, or otherwise initiate, changes that are to be committed by the distributed transaction system and, in such distributed transaction systems, any computing device can initiate changes and, in that respect, all computing devices within the system are considered equal. In such "master-less" distributed transaction systems, all computing devices of the system can be thought of as "masters" and the below descriptions directed to computing devices that are not masters are inapplicable. Nevertheless, for purposes of completeness of description, in distributed transaction systems where one or more computing devices do act as masters, if the computing device receiving a client request is not a master, then the computing device receiving the client request can, in some manner, inform the client accordingly. For example, as shown in the system 500 of FIG. 5, if the computing device 210 to which the initial communication 505 is directed is not a master of the controller nodes 201, then, instead of performing the above described communications 510, 511 and 512, the computing device 210 can, instead, return a message that does not have the authoritative indicator set, such as the reply illustrated by the communication 531. For purposes of illustration, communications shown via a solid line in FIG. 5 are those that could occur if the computing device 210 was the master of the controller nodes 201. Conversely, communications shown via a dashed line in FIG. 5 are those that could occur if the computing device 210 was not a master.

Upon receiving a communication that does not have the authoritative indicator set, or that actively indicates that the computing device transmitting such communication is not a master, such as the communication 531, the client driver 252 executing on the computing device 250 can return a query for a current master to the computing device 210, as illustrated by the communication 540. In response, the computing device 210 can provide an identification of a current master to the computing device 250. Such a response is illustrated by the communication 545 in FIG. 5. The client driver 252 can then direct the request that was originally directed to the computing device 210, via the communication 505, to the identified master, such as, for example, the computing device 590, as illustrated by the communication 550. The controller service 593 executing on the computing device 590, which is currently a master of the controller nodes 201, can operate in a manner analogous to that described above with reference to the controller service 213. In particular, the controller service 593 executing on the computing device 590 that was identified as the new master of the controller nodes 201 can commit the changes necessitated by the requested transaction to its copy of the controller service information store 595, as illustrated by the communication 560. Similarly, the controller service 593 can also communicate the relevant changes to at least a sufficient number of the other computing devices of the controller nodes 201 such that the change is considered to have been accepted by the distributed transaction system being implemented by the controller nodes 201. For example, the controller service 593 can communicate the relevant changes to the computing devices 570 and 580, as illustrated by the communications 561 and 562, respectively. Upon receiving such communications, the controller services 573 and 583 that are executing on the computing devices 570 and 580, respectively, can commit those changes to their copies of the controller service information store, namely the controller service information stores 575 and 585, respectively, such as in the manner described above with reference to communications 521 and 522, respectively. Once a sufficient quantity, or percentage, of the controller nodes 201 have committed a change to their copies of the controller service information store, a success message can be returned to the client driver 252 with an authoritative indicator set, such as is illustrated by the communication 569. In such a manner one or more client nodes can communicate with the controller nodes 201 while maintaining a distributed transaction system.

Figure 6:
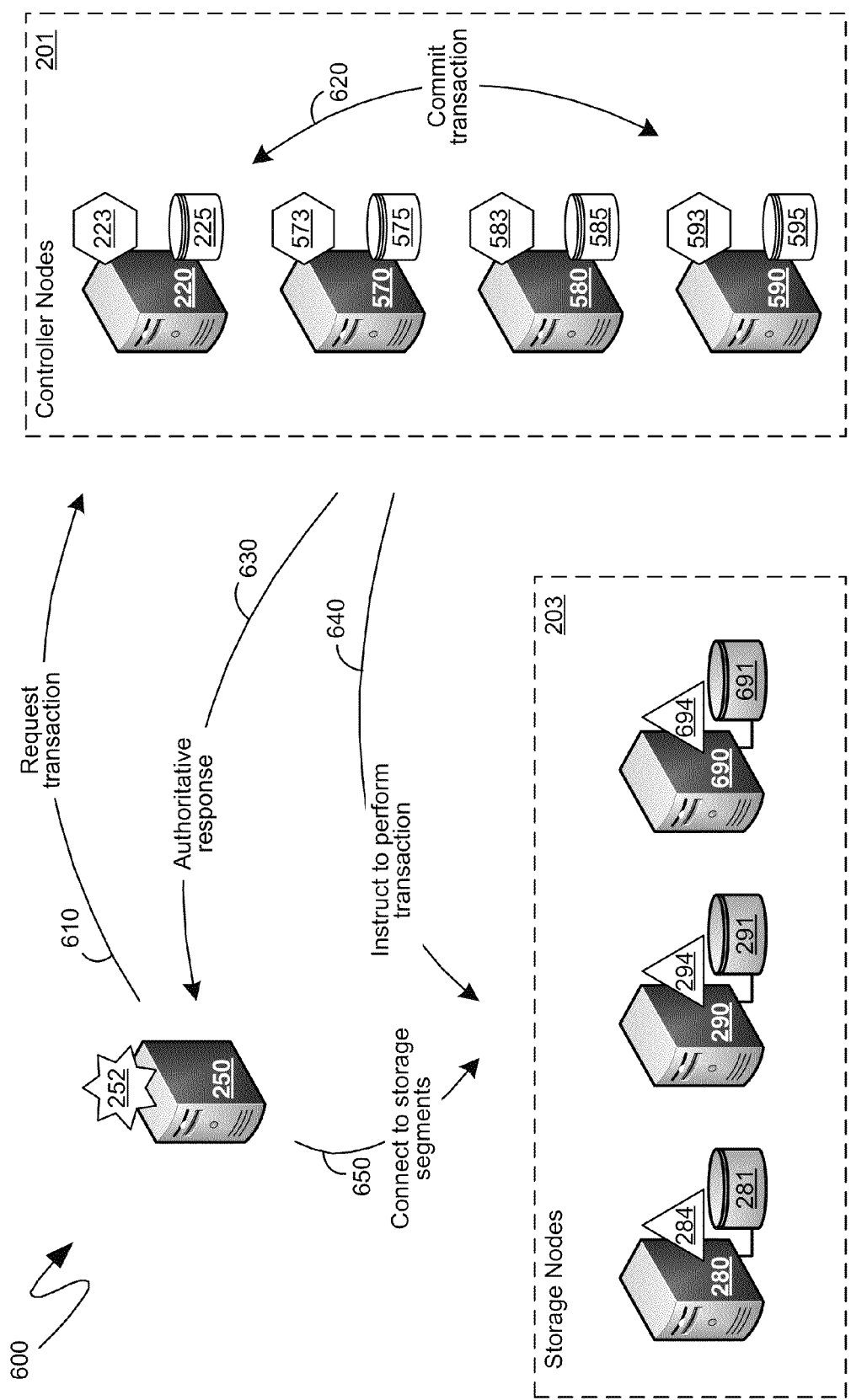
FIG. 6 is a block diagram illustrating an exemplary series of communications between a client, controller nodes and storage nodes in implementing virtual disks.

Turning to FIG. 6, the system 600 shown therein illustrates an exemplary series of communications between one of the client nodes, namely the computing device 250 upon which is executing the client driver 252, and the controller nodes 201 and the storage nodes 203. The client driver 252 can request a transaction from the controller nodes 201, such as any of the transactions described above, via the communication 610. The controller nodes 201 can then commit the changes necessitated by that transaction to at least a sufficient number, or percentage, of the individual copies of the controller service information stores to be considered to have been recorded by the distributed transaction system that can be implemented by the controller nodes 201. The committing of the transaction to the individual copies of the controller service information stores, such as, for example, the individual controller service information stores 225, 575, 585 and 595 that are maintained by the individual computing devices 220, 570, 580 and 590, respectively can be performed in the manner described in detail above with reference to FIG. 5 and is generically illustrated in FIG. 6 by the communications 620 among the controller nodes 201. An authoritative response can ultimately be received, from the controller nodes 201, by the client driver 252 that is executing on the computing device 250, as illustrated by the communication 630.

Additionally, the controller nodes 201 can direct, via the communications 640, instructions to individual ones of the storage nodes 203 such as, for example, the computing devices 280 290 and 690 that are exemplarily illustrated as part of the storage nodes 203 in the system 600 of FIG. 6. Although not specifically illustrated in the system 600 of FIG. 6, individual ones of the storage nodes 203 can also communicate with the controller nodes 201 to provide information to the controller nodes 201 such as, for example, information indicating that the individual computing device is executing a storage service and has available storage capacity that can be utilized to support a virtual disk. Based on information received from the controller nodes 201, which can be provided by the communication 630, the client driver 252 can connect to the storage segments of the storage nodes 203, as illustrated by the communications 650, and can provide data thereto to be stored as part of the storage of data on the virtual disk that is supported by the client driver 252 as well as retrieving data therefrom when such data is requested from the virtual disk by processes executing on the computing device 250.

In one embodiment, one of the transactions that can be requested by the client driver 252, of the controller nodes 201, such as via the communication 610, can be the generation of a topology, such as the topology described in detail above and illustrated in FIG. 4, for a new virtual disk that the driver 252 seeks to present to the operating system and other applications and processes executing on the computing device 250. The controller nodes 201 can generate such a topology and, in one embodiment, can do so "from the ground up". More specifically, the controller nodes 201 can be aware of individual ones of the storage nodes 203 that have storage capacity available on the computer-readable storage media that are communicationally coupled to those individual ones of the storage nodes 203. For example, the storage nodes 203 are shown in the system 600 of FIG. 6 as comprising at least the computing devices 280, 290 and 690 that are executing storage services 284, 294 and 694, respectively and offering available storage capacity of the computer-readable storage media 281, 291 and 691, respectively, that are communicationally coupled to the computing devices 280, 290 and 690. With such information, the controller nodes 201 can construct the lowest level of a topology of a virtual disk such as, for example, the level comprising the mirrored child disks that were shown in the system 400 of FIG. 4. From there, the controller nodes 201 can construct a next higher level such as, for example, the level comprising the striped child disks that were also shown in the system 400 of FIG. 4. The controller nodes 201 can proceed to construct subsequent higher levels of the virtual disk topology, such as the spanned child disks that were shown in the system 400 of FIG. 4, should such subsequent higher levels be appropriate, in accordance with various parameters and limitations that can be provided by the client driver 252. As indicated previously, such parameters and limitations can be modified through the client user interface 302, which was shown in FIG. 3. Alternatively, such parameters and limitations can be informed by the controller user interface 301, also shown in FIG. 3. The resulting constructed topology can be provided to the client driver 252, such as via the communication 630, and the individual ones of the storage nodes 203 from which storage capacity will be required to implement such a constructed topology can be so informed by the communications 640 from the controller nodes 201 to those relevant ones of the storage nodes 203.

In one embodiment, when constructing a virtual disk topology, the controller nodes 201 can take into account various metadata from the storage nodes 203. For example, different computing devices that comprise the storage nodes 203 can be part of different physical groupings of computing devices that can be commonly affected by a single failure event. For example, the computing devices 280 and 290 that are exemplarily illustrated by the system 600 of FIG. 6 as being part of the storage nodes 203 can be computing devices that are housed in the same building, or even in the same rack of computing devices. Were a negative event to occur to such a building or such a rack of computing devices, the computing devices 280 and 290 would be equally affected. For example, were there a power outage, both of the computing devices 280 and 290 would become unavailable. Consequently, the computing devices 280 and 290 can, in the present example, be considered to be part of a single failure domain since failures that affect one of those computing devices may likely affect the other of those computing devices due to their physical association. In generating the above-described topology, the controller nodes 201 can take into account such failure domains. For example, the topology generated by the controller nodes 201 can spread the mirrored child disks across multiple failure domains, thereby providing a greater degree of fault tolerance in seeking to prevent a single failure from affecting multiple ones, or even all, of the mirrored child disks.

The topology of the virtual disk, and other virtual disk metadata, such as that described in detail above, can be part of the information that is retained by the distributed transaction system of the controller nodes 201. Thus, each of the individual controller nodes such as, for example, the computing devices 220, 570, 580 and 590 that are exemplarily illustrated in the system 600 of FIG. 6 as being part of the controller nodes 201, can, individually, in their respective controller service information stores 225, 575, 585 and 595, respectively, maintain such information. If any one of the computing devices 220, 570, 580 or 590, or any other computing device that is part of the controller nodes 201, experiences a failure, local state recovery can be utilized by the controller service on such a controller node to attempt to rebuild its copy of the service information store. For example, if the computing device 220 were to experience a failure, upon a subsequent correction of such a failure into the resumption of proper operation, the controller service 223 executing on the computing device 220 can establish communications with one or more of the other controller nodes 201 and rebuild its copy of the controller service information store 225.

Figure 7:
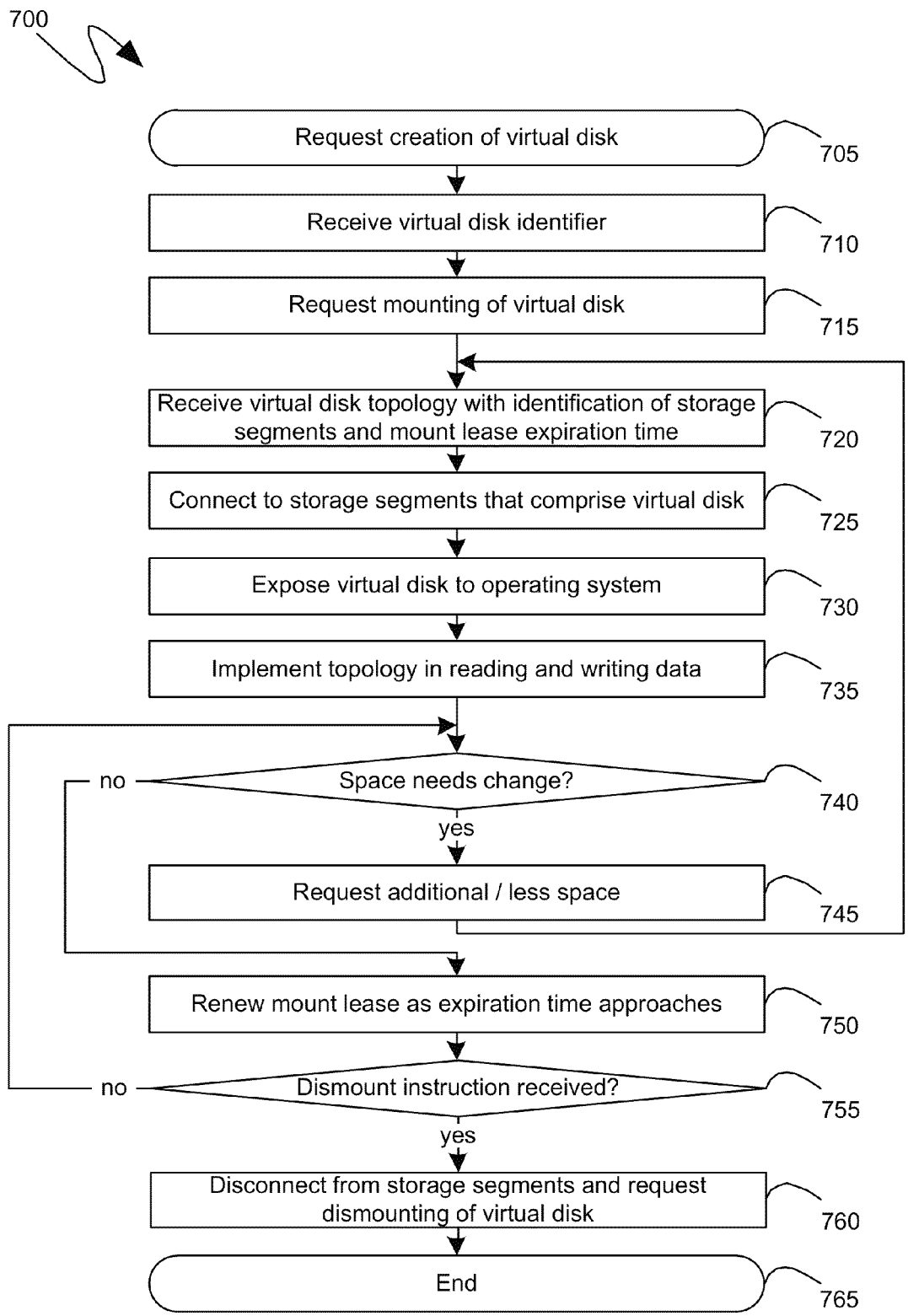
FIG. 7 is a flow diagram illustrating an exemplary series of steps performed by a client process.

Turning to FIG. 7, the flow diagram 700 shown therein illustrates an exemplary series of steps that can be performed by a client driver implementing a virtual disk in accordance with the mechanisms described in detail above. Initially, in one embodiment, at step 705, the client driver can request the creation of a virtual disk, such as from one or more controller nodes. Subsequently, at step 710, an identifier of the virtual disk can be received. Subsequently, at step 715, the virtual disk can be mounted and, in response, at step 720 the created virtual disk topology, such as the exemplary virtual disk topology that was described in detail above with reference to FIG. 4, can be received. Additionally, at step 720, a mount lease expiration time can also be received. By limiting the amount of time that a virtual disk can be mounted by a particular client, such as by limiting the length, in time, of the mount lease that is given to that client, the virtual disk can be un-mounted and made available to another client automatically if the first client were to fail. In particular, a client driver can be required to request an extension of a mount lease and, if the client driver experiences a failure such as, for example, if the computing device on which the client driver is executing experiences a power outage, then the mount lease of the virtual disk can automatically expire without any additional action, thereby making that virtual disk available for mounting on other computing devices that can act as a backup for that initial computing device.

In response to the virtual disk topology was received at step 720, the client driver implementing the virtual disk can connect to the storage segments that comprise the virtual disk at step 725. As described in detail above with reference to FIG. 4, the client driver can maintain a communicational connection with the storage segments that comprise the virtual disk, or, more specifically, with the computing devices to which are communicationally coupled the computer-readable storage media on which such storage segments are stored. At step 730 the client driver can, as indicated previously, expose the virtual disk to the operating system of the computing device on which the client driver is executing to enable the operating system and other applications and processes executing on that computing device to utilize the virtual disk in the same manner as they would utilize any computer-readable storage medium that was communicationally coupled to that computing device. Subsequently, at step 735, as the virtual disk begins to be utilized, the client driver can read data from the virtual disk and write data to the virtual disk in accordance with the topology that was received at step 720, such as in the manner described in detail above with reference to FIG. 4.

In one embodiment, at step 740, a determination can be made as to whether the size of the virtual disk should be changed. For example, there may be a need for an increased amount of storage capacity and the size of the virtual disk can be requested to be increased at step 745. As another example, the virtual disk, as currently sized, can be underutilized and, as a result, at step 745, a request can be made to decrease the storage capacity of the virtual disk. If, at step 740, it is determined that such a change in the size of the virtual disk should be requested, then such a request can be made at step 745 and a new virtual disk topology, directed to a virtual disk having the new storage capacity in accordance with the request at step 745, can be received at step 720. The new virtual disk topology can be utilized in the same manner as before, and step 720 through 735, described in detail above, can be repeated with the new virtual disk topology. If, however, at step 740, it is determined that the size of the virtual disk is appropriate, then processing can proceed to step 750 at which point the mount lease can be renewed as the expiration time approaches. As indicated previously, by requiring the active renewal step 750, an automated mechanism can be implemented by which the virtual disk can become available to other computing devices should the computing device currently utilizing the virtual disk suffer a failure. Of course, if an active dismount instruction is received, such as at step 755, then the mount lease need not be subsequently renewed and processing can proceed to step 760 at which point a dismounting of the virtual disk could be requested, such as of the controller nodes. The relevant processing can then end at step 765. Conversely, if no dismount instruction is received at step 755, processing can return to step 740.

As will be recognized by those skilled in the art, the ordering of the steps shown in the flow diagram 700 of FIG. 7 is exemplary and is not meant to indicate a causal relationship. For example, the renewal of the mount lease at step 750 can occur independently of the other steps of the flow diagram 700. Similarly, steps 740 and 755 need not require explicit checking steps, but rather merely illustrate two alternative possible sequences of steps that can be performed given the presence, or absence, of the circumstances identified in steps 740 and 755.

Figure 8A:
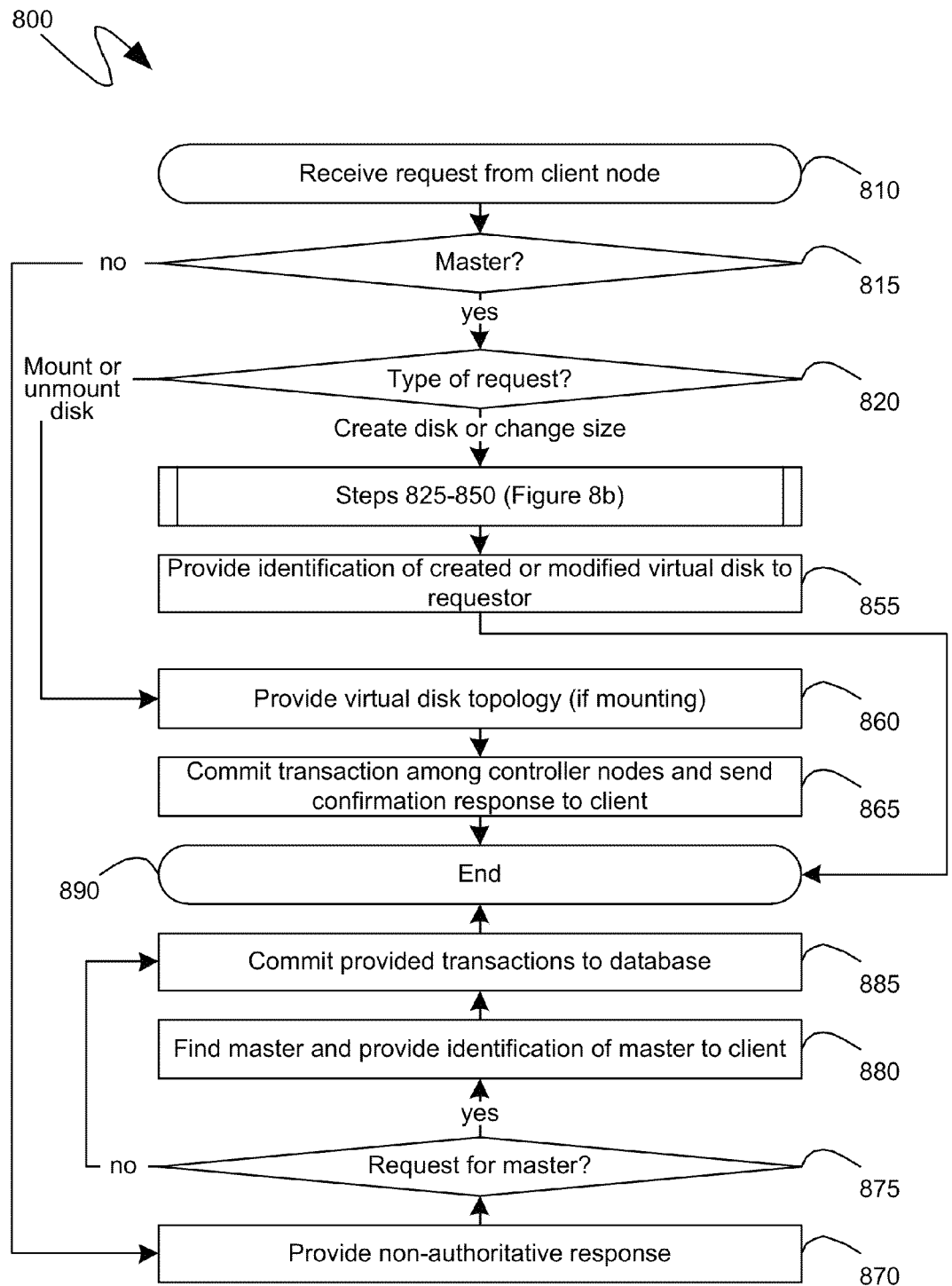
FIGS. 8a and 8b are a flow diagram illustrating an exemplary series of steps performed by a controller process.
Figure 8B:
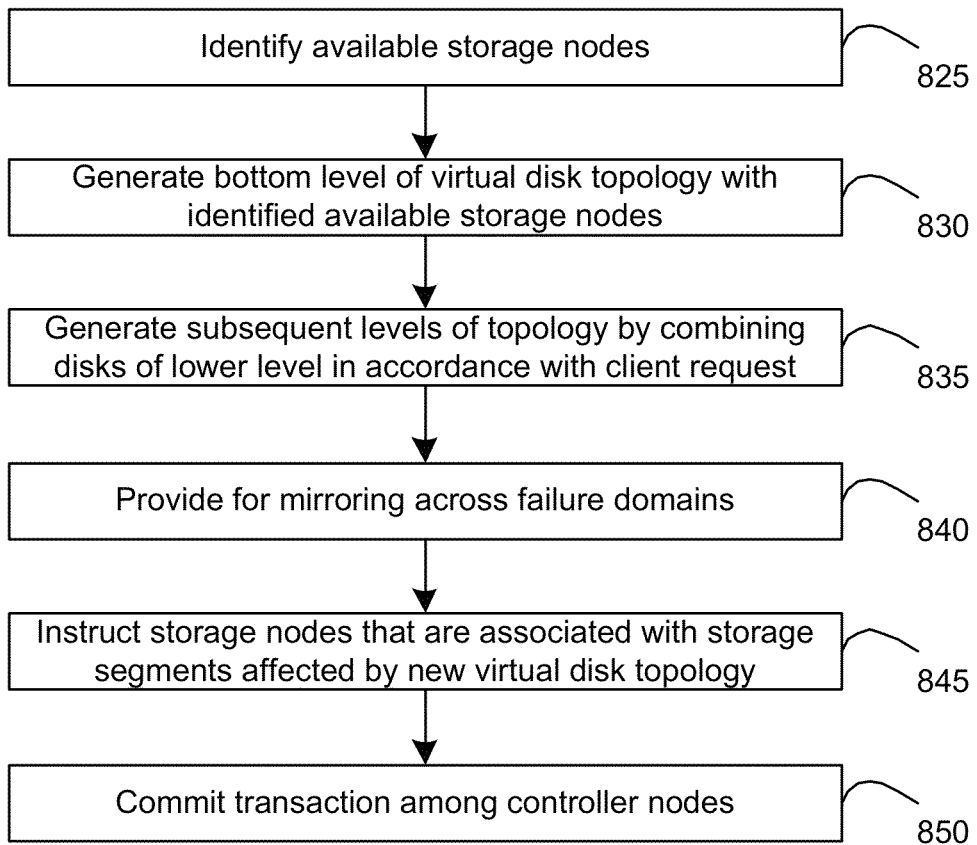

Turning to FIG. 8*a*, the flow diagram 800 shown therein illustrates an exemplary series of steps that can be performed by a controller service, such as can be executing on one or more of the controller nodes described in detail above. For example, at step 810, a request can be received from a client node. If the controller service is executing on a master, as explicitly defined above, and as can be determined by step 815, then processing can proceed to step 820 where a determination can be made of the specific type of request that was received. If the request that was received at step 810 is determined to be, at step 820, a request that is directed to the creation or modification of a virtual disk, then processing can proceed with steps 825 through 850, which are illustrated in FIG. 8*b*. Conversely, if, at step 820, the request that was received at step 810 is determined to be directed to the mounting or un-mounting of a virtual disk, then processing can proceed to step 860.

Turning to FIG. 8*b*, at step 825, an identification can be made of the available storage nodes, such as by determining which computing devices are executing a storage service and are communicationally coupled with computer-readable storage media that have available storage capacity that can be shared via the executed storage service. Subsequently, selecting some of the available storage nodes, a bottom level of the virtual disk topology can be generated at step 830, such as in the manner described in detail above with reference to the topology illustrated in FIG. 4. At step 835, subsequent levels of the virtual disk topology can be generated by combining disks from lower levels in accordance with the client request. For example, if the request that was received at step 810, shown in FIG. 8*a*, was a request to increase the size of the virtual disk, the storage nodes utilized at step 830 and the subsequent topological levels created at step 835 can provide for greater storage capacity in the virtual disk than was previously available, such as by utilizing a greater number of storage nodes and a greater number of spanned child disks, such as the spanned child disks described in detail above with reference to FIG. 4.

At step 840, in generating the topology, failure domains can be identified which, as indicated previously, can comprise computing devices that can commonly be affected by a single failure, such as a power outage, or natural disaster. The generated topology can provide for mirroring across those failure domains for greater reliability. Subsequently, at step 845, the storage nodes that are associated with the storage segments that were affected by this newly created virtual disk topology can be informed. At step 850, the relevant transactions, such as the creation of the virtual disk topology, can be committed by the distributed transaction system that is being implemented by the controller nodes, such as by being committed, individually, to at least a sufficient number, or percentage, of the individual copies of the controller service information stores being individually maintained by individual ones of the controller nodes.

Processing can then return to the flow diagram 800 of FIG. 8*a*. Turning back to FIG. 8*a*, after the performance of steps 825 through 850, as described above, processing can proceed with step 855, where an identifier, or other identification, of the virtual disk can be provided to the entity making the request that was received at step 810. The relevant processing can then end at step 890. Alternatively, if the request that was received at step 810 was directed to the mounting or un-mounting of a virtual disk, as determined at step 820, then processing can proceed with step 860 at which point the virtual disk topology can be provided to the entity making the request, if the request was a mount request, or, if it was an unmounts request, processing can skip step 860 and proceed to step 865 at which point the relevant changes are committed to the locally maintained controller service information store. The relevant processing can then end at step 890.

The above-described steps have been in the context of operating as a master of the controller nodes, such as can have been determined at step 815. If, at step 815, it is, instead, determined that the controller service executing the steps of the flow diagram 800 is not executing on a master, then processing can proceed to step 870 where a non-authoritative indicator can be returned to the entity making the request at step 810. Subsequently, if a request for a master is received at step 875, then processing can proceed to step 880 at which point a master can be identified and, subsequently, that identification of the master can be provided to the requesting entity. If, as determined at step 815, the controller service executing the steps of the flow diagram 800 is not executing on a master, then at some point in time, although not necessarily causally related to the performance of step 880, communications can be received from a master that can request the commitment of certain transactions to the local controller service information store. Such transactions can be committed to the local controller service information store at step 885. The commitment of transactions to the local controller service information store can continue so long as such communications are received from a master. Otherwise, the relevant processing can end at step 899.

As can be seen from the above descriptions, mechanisms for aggregating available storage capacity from multiple storage media into a single virtual disk has been presented. In view of the many possible variations of the subject matter described herein, we claim as our invention all such embodiments as may come within the scope of the following claims and equivalents thereto.

We claim:

1. One or more computer-readable storage media comprising computer-executable instructions for implementing a virtual disk, the computer-executable instructions performing steps comprising:

receiving a virtual disk topology comprising a specification of: a top layer of child disks supporting the virtual disk, a bottom layer of child disks supporting each of the child disks in the top layer of child disks, and storage nodes supporting each of the child disks in the bottom layer of child disks such that data stored on each of the child disks in the bottom layer of child disks is actually stored in a storage segment that is stored on a computer-readable storage medium that is communicationally coupled to a computing device that is part of the storage nodes;

presenting the virtual disk to an operating system as a standard computer-readable storage medium;

receiving a first request from the operating system to store a first set of data on the virtual disk;

storing, in response to the receiving the first request, the first set of data at least some of the storage nodes in accordance with the received virtual disk topology;

receiving a second request from the operating system to read a second set of data from the virtual disk;

reading, in response to the receiving the second request, the second set of data from at least some of the storage nodes in accordance with the received virtual disk topology.

2. The computer-readable storage media of claim 1, comprising further computer-executable instructions for receiving a mount lease with the virtual disk topology and requesting an extension to the mount lease prior to an expiration of the mount lease.

3. The computer-readable storage media of claim 1, comprising further computer-executable instructions for storing, on multiple controller node computing devices, virtual disk metadata.

4. The computer-readable storage media of claim 3, wherein the virtual disk metadata comprises operational states of the storage nodes; and wherein further the computer-readable storage media comprise further computer-executable instructions for determining the operational states of the storage nodes.

5. The computer-readable storage media of claim 1, wherein the bottom layer of child disks comprises mirrored child disks such that multiple mirrored child disks each comprise a complete copy of data from a single higher layer disk that is supported by the multiple mirrored child disks.

6. The computer-readable storage media of claim 5, comprising further computer-executable instructions for determining if one of the multiple mirrored child disks is a last active child disk such that all of the other ones of the multiple mirrored child disks are not active; and, in response to the determining that one of the multiple mirrored child disks is the last active child disk, increasing a rate of synchronization of the last active child disk to another mirrored child disk.

7. The computer-readable storage media of claim 6, comprising further computer-executable instructions for determining if one of the multiple mirrored child disks is a last active child disk such that all of the other ones of the multiple mirrored child disks are not active; and, in response to the determining that one of the multiple mirrored child disks is the last active child disk, requesting a wholly new mirrored child disk to which the last active child disk can be synchronized.

8. The computer-readable storage media of claim 1, wherein the top layer of child disks comprises spanned child disks such that a storage capacity of the virtual disk is a sum of a storage capacity of each of the spanned child disks, in the top layer of child disks, supporting the virtual disk.

9. The computer-readable storage media of claim 1, wherein the bottom layer of child disks supports each of the child disks in the top layer of child disks indirectly through an intermediate layer of child disks such that each of the child disks in the top layer is supported by multiple ones of the child disks in the intermediate layer of child disks and each of the child disks in the intermediate layer of child disks is supported by multiple ones of the child disks in the bottom layer of child disks.

10. The computer-readable storage media of claim 9, wherein the intermediate layer of child disks comprises striped child disks such that data stored on one of the child disks in the top layer of child disks is striped across a defined set of at least some of the striped child disks.

11. One or more computer-readable storage media comprising computer-executable instructions for implementing a virtual disk, the computer-executable instructions performing steps comprising:

generating a virtual disk topology comprising a specification of: a top layer of child disks supporting the virtual disk, a bottom layer of child disks supporting each of the child disks in the top layer of child disks, and storage nodes supporting each of the child disks in the bottom layer of child disks such that data stored on each of the child disks in the bottom layer of child disks is actually stored in a storage segment that is stored on a computer-readable storage medium that is communicationally coupled to a computing device that is part of the storage nodes;

receiving requests from a client node utilizing the virtual disk;

receiving updates from the storage nodes supporting the virtual disk; and committing transactions to a locally-maintained copy of a controller service information store, the transactions being necessitated by the received requests and updates.

12. The computer-readable storage media of claim 11, comprising further computer-executable instructions for identifying failure domains among the storage nodes, the failure domains delineating two or more storage nodes sharing equivalent vulnerabilities to a specific failure, and providing for mirroring of data across failure domains.

13. The computer-readable storage media of claim 11, wherein the computer-executable instructions for generating the virtual disk topology comprise computer-executable instructions for generating the bottom layer of child disks prior to the top layer of child disks, wherein the generation of the top layer of child disks is informed by the previously generated bottom layer of child disks.

14. The computer-readable storage media of claim 11, comprising further computer-executable instructions for instructing the storage nodes to create the storage segments.

15. The computer-readable storage media of claim 11, wherein the bottom layer of child disks comprises mirrored child disks such that multiple mirrored child disks each comprise a complete copy of data from a single higher layer disk that is supported by the multiple mirrored child disks.

16. The computer-readable storage media of claim 11, wherein the top layer of child disks comprises spanned child disks such that a storage capacity of the virtual disk is a sum of a storage capacity of each of the spanned child disks, in the top layer of child disks, supporting the virtual disk.

17. The computer-readable storage media of claim 11, wherein the bottom layer of child disks supports each of the child disks in the top layer of child disks indirectly through an intermediate layer of child disks such that each of the child disks in the top layer is supported by multiple ones of the child disks in the intermediate layer of child disks and each of the child disks in the intermediate layer of child disks is supported by multiple ones of the child disks in the bottom layer of child disks.

18. The computer-readable storage media of claim 17, wherein the intermediate layer of child disks comprises striped child disks such that data stored on one of the child disks in the top layer of child disks is striped across a defined set of at least some of the striped child disks.

* * * * *